US008823660B2

(12) United States Patent
Krah et al.

(10) Patent No.: US 8,823,660 B2
(45) Date of Patent: *Sep. 2, 2014

(54) MULTI-TOUCH AUTO SCANNING

(75) Inventors: Christoph Horst Krah, Los Altos, CA (US); Minh-Dieu Thi Vu, Cupertino, CA (US); Thomas James Wilson, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/340,153

(22) Filed: Dec. 29, 2011

(65) Prior Publication Data

US 2012/0157167 A1    Jun. 21, 2012

Related U.S. Application Data

(62) Division of application No. 11/650,040, filed on Jan. 3, 2007, now Pat. No. 8,125,456.

(51) Int. Cl.
*G09G 5/00* (2006.01)
*G06F 3/044* (2006.01)
*G06F 1/32* (2006.01)
*G06F 3/041* (2006.01)

(52) U.S. Cl.
CPC ............. *G06F 3/044* (2013.01); *G06F 1/3203* (2013.01); *G06F 1/3262* (2013.01); *G06F 3/0416* (2013.01)
USPC ...... 345/173; 345/174; 178/18.01; 178/18.06

(58) Field of Classification Search
USPC .................. 345/173–178; 178/18.01–18.06
See application file for complete search history.

(56) References Cited

U.S. PATENT DOCUMENTS

| 4,899,138 A | 2/1990 | Araki et al. |
| 5,831,593 A | 11/1998 | Rutledge |
| 6,054,979 A | 4/2000 | Sellers |

(Continued)

FOREIGN PATENT DOCUMENTS

| EP | 0 626 633 A1 | 11/1994 |
| EP | 0 626 633 B1 | 11/1994 |

(Continued)

OTHER PUBLICATIONS

Non-Final Office Action mailed Nov. 16, 2012, for U.S. Appl. No. 12/022,572, filed Jan. 30, 2008, 24 pages.

(Continued)

*Primary Examiner* — Jennifer Nguyen
(74) *Attorney, Agent, or Firm* — Morrison & Foerster LLP

(57) ABSTRACT

A system and method for autonomously scanning a sensor panel device is disclosed. A sensor panel processor can be disabled after a first predetermined amount of time has elapsed without the sensor panel device sensing any events. One or more system clocks can also be disabled to conserve power. While the processor and one or more system clocks are disabled, the sensor panel device can periodically autonomously scan the sensor panel for touch activity. If one or more results from the autonomous scans exceed a threshold, the sensor panel device re-enables the processor and one or more clocks to actively scan the sensor panel. If the threshold is not exceeded, the sensor panel device continues to periodically autonomously scan the sensor panel without intervention from the processor. The sensor panel device can periodically perform calibration functions to account for any drift that may be present in the system.

45 Claims, 7 Drawing Sheets

(56) References Cited

U.S. PATENT DOCUMENTS

| | | | |
|---|---|---|---|
| 6,236,386 B1 | 5/2001 | Watanabe | |
| 7,180,477 B2 | 2/2007 | Howell | |
| 7,737,957 B2 * | 6/2010 | Lee et al. | 345/173 |
| 7,825,912 B2 * | 11/2010 | Lee | 345/175 |
| 8,049,732 B2 | 11/2011 | Hotelling et al. | |
| 8,085,247 B2 | 12/2011 | Wilson | |
| 8,094,128 B2 * | 1/2012 | Vu et al. | 345/173 |
| 8,125,456 B2 | 2/2012 | Krah et al. | |
| 8,310,472 B2 * | 11/2012 | Vu et al. | 345/204 |
| 8,390,588 B2 * | 3/2013 | Vu et al. | 345/173 |
| 8,471,837 B2 | 6/2013 | Vu et al. | |
| 8,479,122 B2 | 7/2013 | Hotelling et al. | |
| 8,542,208 B2 | 9/2013 | Krah et al. | |
| 2003/0107557 A1 | 6/2003 | Liebenow et al. | |
| 2005/0144524 A1 | 6/2005 | Bonaccio et al. | |
| 2005/0146511 A1 | 7/2005 | Hill et al. | |
| 2006/0092143 A1 * | 5/2006 | Kasai et al. | 345/175 |
| 2006/0114247 A1 | 6/2006 | Brown | |
| 2006/0278444 A1 * | 12/2006 | Binstead | 178/18.06 |
| 2007/0035528 A1 | 2/2007 | Hodge | |
| 2007/0109274 A1 | 5/2007 | Reynolds | |
| 2008/0012835 A1 * | 1/2008 | Rimon et al. | 345/173 |
| 2008/0153418 A1 | 6/2008 | Melanson | |
| 2012/0098778 A1 | 4/2012 | Vu et al. | |
| 2012/0162129 A1 | 6/2012 | Krah et al. | |

FOREIGN PATENT DOCUMENTS

| | | |
|---|---|---|
| JP | 04-096816 A | 3/1992 |
| JP | 06-067793 A | 3/1994 |
| JP | 09-198186 A | 7/1997 |
| JP | 2005-092341 A | 4/2005 |
| JP | 2007-533044 A | 11/2007 |
| WO | WO-2005/114369 A2 | 12/2005 |
| WO | WO-2005/114369 A3 | 12/2005 |

OTHER PUBLICATIONS

Notice of Allowance mailed Nov. 20, 2012, for U.S. Appl. No. 12/726,126, filed Mar. 17, 2010, five pages.

Non-Final Office Action mailed Jan. 22, 2013, for U.S. Appl. No. 13/405,221, filed Feb. 24, 2012, seven pages.

Notice of Allowance mailed Mar. 1, 2012, for U.S. Appl. No. 12/723,437, filed Mar. 12, 2010, seven pages.

Notice of Allowance mailed Feb. 19, 2013, for U.S. Appl. No. 12/723,437, filed Mar. 12, 2010, eight pages.

Non-Final Office Action mailed Mar. 19, 2012, for U.S. Appl. No. 12/726,107, filed Mar. 17, 2010, eight pages.

Non-Final Office Action mailed Mar. 21, 2012, for U.S. Appl. No. 12/726,126, filed Mar. 17, 2012, eight pages.

Non-Final Office Action mailed Apr. 12, 2012, for U.S. Appl. No. 12/022,572, filed Jan. 30, 2008, 21 pages.

Supplementary European Search Report mailed Feb. 21, 2012, for EP Application No. 07866002.4, seven pages.

Final Office Action mailed Aug. 3, 2012, for U.S. Appl. No. 12/022,572, filed Jan. 30, 2008, 22 pages.

Final Office Action mailed Aug. 10, 2012, for U.S. Appl. No. 12/726,126, filed Mar. 17, 2012, five pages.

Notice of Allowance mailed Jul. 9, 2012, for U.S. Appl. No. 12/726,107, filed Mar. 17, 2010, seven pages.

Final Office Action mailed Apr. 10, 2013, for U.S. Appl. No. 12/022,572, filed Jan. 30, 2008, 25 pages.

Non-Final Office Action mailed Sep. 6, 2013, for U.S. Appl. No. 13/343,604, filed Jan. 4, 2012, five pages.

Notice of Allowance mailed Jun. 20, 2013, for U.S. Appl. No. 13/405,221, filed Feb. 24, 2012, six pages.

* cited by examiner

MULTI-TOUCH AUTO SCANNING

CROSS-REFERENCE TO RELATED APPLICATION

This application is a divisional of U.S. application Ser. No. 11/650,040, entitled "MULTI-TOUCH AUTO SCANNING," filed on Jan. 3, 2007, the entire disclosure of which is incorporated herein by reference for all purposes.

FIELD OF THE INVENTION

This relates generally to electronic devices (e.g., touch screen devices) capable disabling various components (e.g., system clock and processor) during periods of inactivity, and, in particular, a system and method that initiates a low power auto-scan mode during periods of inactivity.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens may include a touch panel, which may be a clear panel with a touch-sensitive surface. The touch panel may be positioned in front of a display screen so that the touch-sensitive surface covers the viewable area of the display screen. Touch screens may allow a user to make selections and move a cursor by simply touching the display screen via a finger or stylus. In general, the touch screen may recognize the touch and position of the touch on the display screen, and the computing system may interpret the touch and thereafter perform an action based on the touch event.

One limitation of many conventional touch panel technologies is that they are only capable of reporting a single point or touch event, even when multiple objects come into contact with the sensing surface. That is, they lack the ability to track multiple points of contact at the same time. Thus, even when two points are touched, these conventional devices only identify a single location, which is typically the average between the two contacts (e.g. a conventional touchpad on a notebook computer provides such functionality). This single-point identification is a function of the way these devices provide a value representative of the touch point, which is generally by providing an average resistance or capacitance value.

Moreover, a concern with many touch devices is the amount of power they consume when actively scanning a touch sensor panel. The high power consumption problem may be particularly important for hand-held devices, as a hand-held device's limited power supply can be readily consumed by actively scanning the touch sensor panel as well as processing those scans. These scans can be wasteful if there is no touch-activity on the panel for an extended period of time.

A possible remedy for a loss of power consumption during periods of inactivity is to shut down (i.e. turn off) the touch panel or touch panel device. But doing so can have several disadvantages, such as consuming even more power when turning the touch panel back on (particularly if the period of inactivity is not an extended period of time) and the inconvenience to the user for having to wait for the touch panel to turn back on. Additionally, a user may forget to turn the touch panel off, so the device continues to actively scan the touch panel despite the user is not inputting any touch data.

SUMMARY OF THE INVENTION

A multi-touch touch system is disclosed herein. One aspect of the multi-touch touch system relates disabling components of a touch-panel device during periods of inactivity to conserve power. Components that can be disabled include a touch-panel processor and system clock.

Another aspect of the multi-touch system relates to having an auto-scan mode that periodically scans a touch panel for touch events, without intervention from a multi-touch processor. If predefined activity is detected, then the multi-touch processor can be enabled to actively scan the touch panel for touch events.

Another aspect of the multi-touch system relates to using a "sniff" mode to scan a touch panel for touch events after a predetermined amount of time has transpired. The multi-touch system can also have a calibration timer that automatically enables a multi-touch processor and system clocks to perform an active scan and calibration functions after a different predetermined amount of time has transpired.

Yet a further aspect of the multi-touch system relates to measuring stray capacitance in a touch panel sensor during an auto-scan mode.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be used and structural changes may be made without departing from the scope of the preferred embodiments of the present invention.

A plurality of touch sensors in a multi-touch panel can enable a computing system to sense multi-touch events (the touching of fingers or other objects upon a touch-sensitive surface at distinct locations at about the same time) and perform additional functions not previously available with touch sensor devices Although some embodiments may be described herein in terms of capacitive touch sensors in a multi-touch panel, it should be understood that embodiments of the invention are not so limited, but are generally applicable to the use of any type of multi-touch sensor technology that may include resistive touch sensors, surface acoustic wave touch sensors, electromagnetic touch sensors, near field imaging touch sensors, and the like. Furthermore, although the touch sensors in the multi-touch panel may be described herein in terms of an orthogonal array of touch sensors having rows and columns, it should be understood that embodiments of the invention are not limited to orthogonal arrays, but may be generally applicable to touch sensors arranged in any number of dimensions and orientations, including diagonal, concentric circle, and three-dimensional and random orientations.

In general, multi-touch panels may be able to detect multiple touches (touch events or contact points) that occur at or about the same time, and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Figure 1:
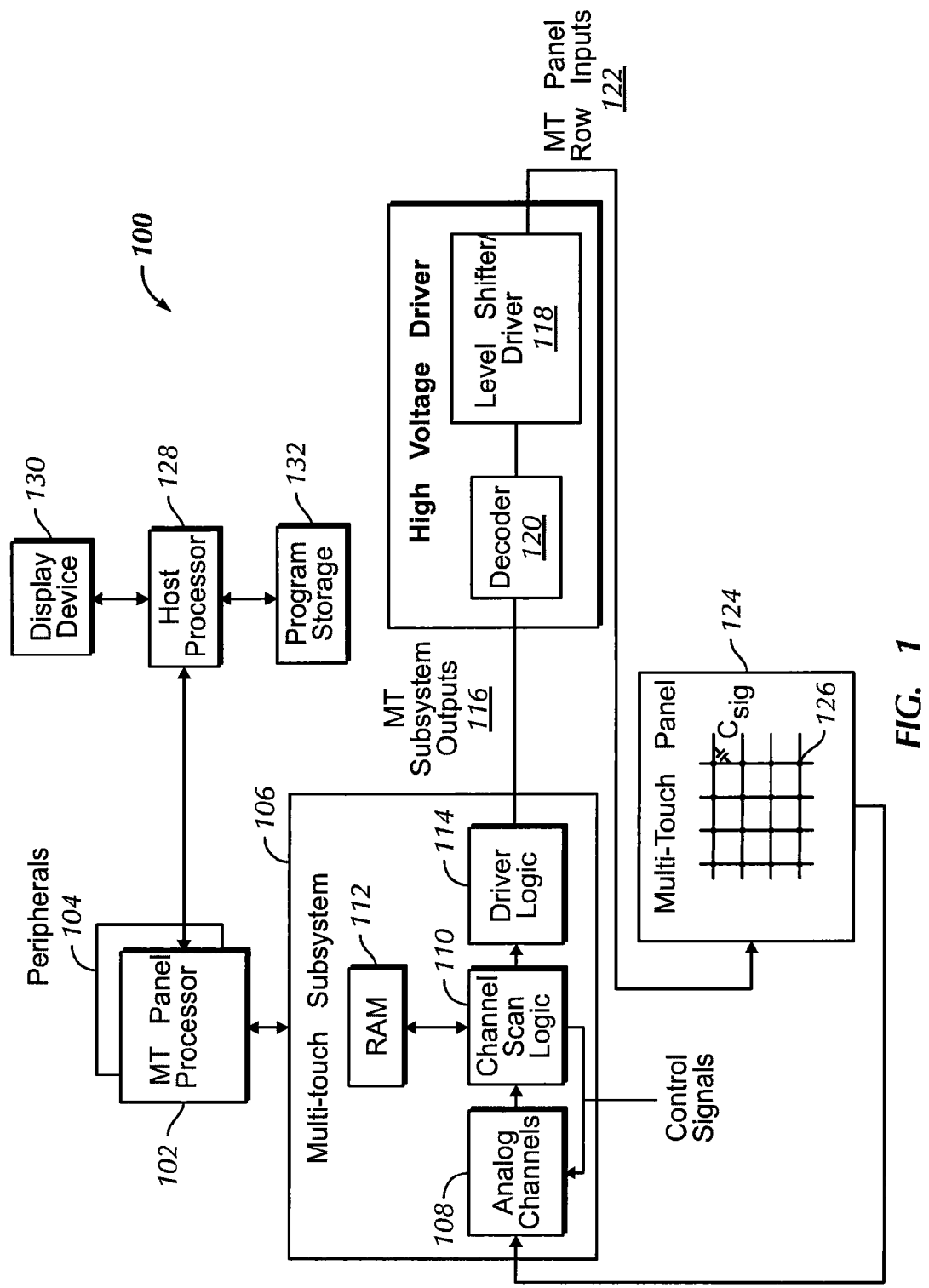
FIG. 1 illustrates an exemplary computing system using a multi-touch panel input device in accordance with one embodiment of the present invention.

FIG. 1 illustrates computing system 100 using touch sensors according to one embodiment. Computing system 100 may correspond to computing devices such as desktops, laptops, tablets or handhelds, including personal digital assistants (PDAs), digital music and/or video players and mobile telephones. Computing system 100 may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

Computing system 100 may include one or more multi-touch panel processors 102 and peripherals 104, and multi-touch subsystem 106. The one or more processors 102 can be ARM968 processors or other processors with similar functionality and capabilities. However, in other embodiments, the multi-touch panel processor functionality may be implemented instead by dedicated logic such as a state machine. Peripherals 104 may include, but are not limited to, random access memory (RAM) or other types of memory or storage, watchdog timers and the like. Multi-touch subsystem 106 may include, but is not limited to, one or more analog channels 108, channel scan logic 110 and driver logic 114. Channel scan logic 110 may access RAM 112, autonomously read data from the analog channels and provide control for the analog channels. This control may include multiplexing columns of multi-touch panel 124 to analog channels 108. In addition, channel scan logic 110 may control the driver logic and stimulation signals being selectively applied to rows of multi-touch panel 124. In some embodiments, multi-touch subsystem 106 may be integrated into a single application specific integrated circuit (ASIC).

Driver logic 114 can provide multiple multi-touch subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124. Each multi-touch panel row input 122 can drive one or more rows in multi-touch panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Multi-touch panel 124 can in some embodiments include a capacitive sensing medium having a plurality of row traces or driving lines and a plurality of column traces or sensing lines, although other sensing media may also be used. The row and column traces may be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials, such as mylar. An additional dielectric cover layer may be placed over the row or column traces to strengthen the structure and protect the entire assembly from damage.

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Computing system 100 can also include host processor 128 for receiving outputs from multi-touch panel processor 102 and performing actions based on the outputs that may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 may also perform additional functions that may not be related to multi-touch panel processing, and can be coupled to program storage 132 and display device 130 such as an LCD display for providing a user interface (UI) to a user of the device.

Figure 2A:
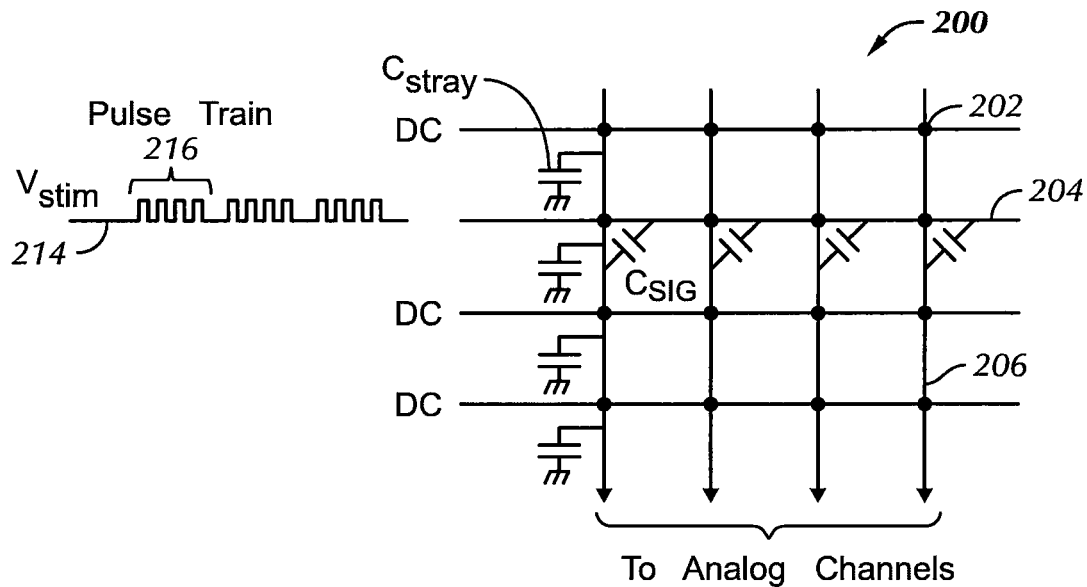
FIG. 2a illustrates an exemplary capacitive multi-touch panel in accordance with one embodiment of the present invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
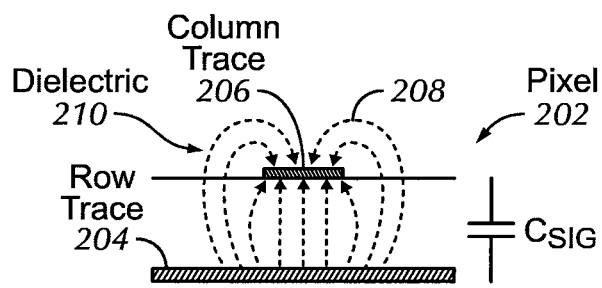
FIG. 2b is a side view of an exemplary capacitive touch sensor or pixel in a steady-state (no-touch) condition in accordance with one embodiment of the present invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 represents a signal capacitance Csig between the row and column electrodes and can cease a charge to be injected form a stimulated row to a column electrode. Since Csig is referenced to virtual ground, it also makes up a stray capacitance. For example, a total stray capacitance of a column electrode can be the sum of all signal capacitances Csig between a given column and all row electrodes. Assuming that CSig is for example 0.75 pF and a column electrode is intersected by fifteen row electrodes, the total stray capacitance on that column electrode would be at least 15×0.75 pF=11.25 pF. In reality, however, the total stray capacitance is likely larger due to a trace stray capacitance of the column electrode to the multi-touch ASIC or other stray capacitances in the system.

Figure 2C:
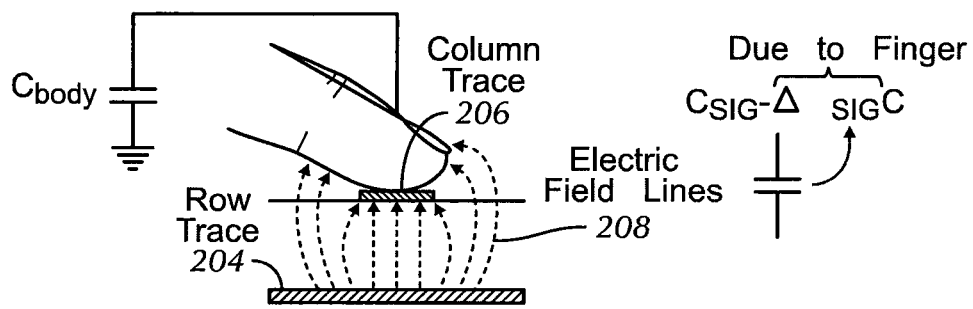
FIG. 2c is a side view of the exemplary capacitive touch sensor or pixel in a dynamic (touch) condition in accordance with one embodiment of the present invention.

FIG. 2c is a side view of exemplary pixel 202 in a dynamic (touch) condition. In FIG. 2c, finger 212 has been placed near pixel 202. Finger 212 is a low-impedance object at signal frequencies, and represents an CA ground return path to via body capacitance Cbody. The body has a self-capacitance to ground Cbody, which is a function of, among other things, body size and geometry. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by Csig_sense. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to minimize the effect of any noise sources. Vstim signal 214 essentially injects a charge into the row via signal capacitance Csig, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column can provide a result representing a mutual capacitance between a row being stimulated and a column the row is connected to. Specifically, this mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3A:
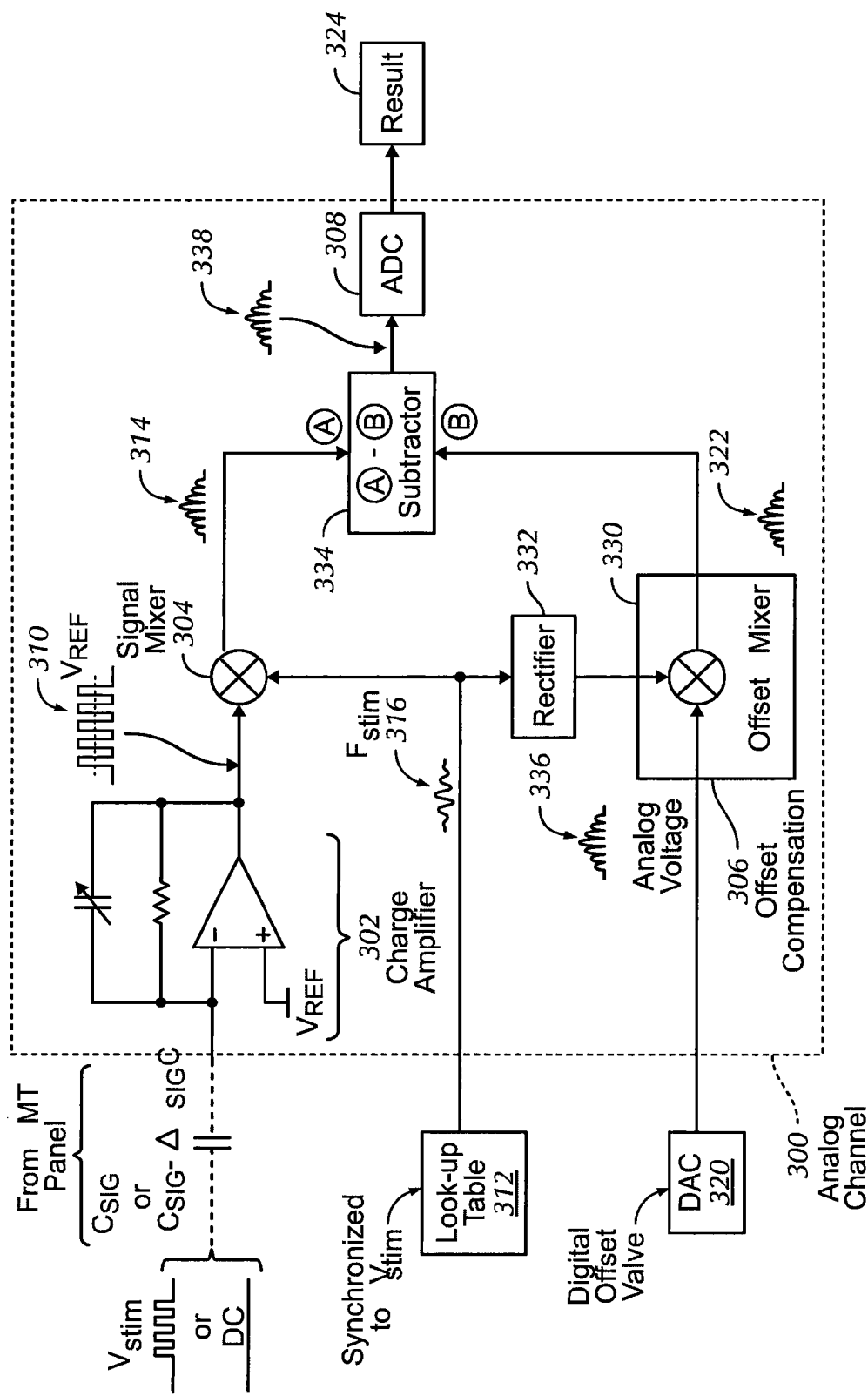
FIG. 3a illustrates an exemplary analog channel in accordance with one embodiment of the present invention.

FIG. 3a illustrates exemplary analog channel or event detection and demodulation circuit 300. One or more analog channels 300 can be present in the multi-touch subsystem. One or more columns from a multi-touch panel can be connectable to each analog channel 300. Each analog channel 300 can include virtual-ground charge amplifier 302, signal mixer 304, offset compensation 306, rectifier 332, subtractor 334, and analog-to-digital converter (ADC) 308. FIG. 3a also shows, in dashed lines, the steady-state signal capacitance Csig that can be contributed by a multi-touch panel column connected to analog channel 300 when an input stimulus Vstim is applied to a row in the multi-touch panel and no finger, palm or other object is present, and the dynamic signal capacitance Csig–ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of charge amplifier 302 can be pulse train 310 centered at Vref with a peak-to-peak (p-p) amplitude in the steady-state condition that is a fraction of the p-p amplitude of Vstim, the fraction corresponding to the gain of charge amplifier 302, which is equivalent to the ratio of signal capacitance Csig and preamplifier feedback capacitance Cfb. For example, if Vstim includes 18V p-p pulses and the gain of the charge amplifier is 0.1, then the output of the charge amplifier can be 1.8V p-p pulses. This output can be mixed in signal mixer 304 with demodulation waveform Fstim 316.

Since the stimulation signal can be a square wave, it may be advantageous to use a sinusoidal demodulation waveform to remove the harmonics of the square wave. In order to reduce the stop band ripple of the mixer at a given stimulation frequency, it can be advantageous to use a Gaussian shaped sinewave. The demodulation waveform can have the same frequency as the stimulus Vstim and can be synthesised from a Lookuptable, enabling generation of any shape of demodulation waveform. Besides Gaussian shaped sinewaves, other waveshapes may be programmed to tune the filter characteristics of the mixers. In some embodiments, Fstim 316 may be tunable in frequency and amplitude by selecting different digital waveforms in the LUT 312 or generating the waveforms differently using other digital logic. Signal mixer 304 may demodulate the output of charge amplifier 310 by subtracting Fstim 316 from the output to provide better noise rejection. Signal mixer 304 may reject all frequencies outside the passband, which may in one example be about +/−30 kHz around Fstim. This noise rejection may be beneficial in noisy environment with many sources of noise, such as 802.11, Bluetooth and the like, all having some characteristic frequency that may interfere with the sensitive (femt-farad level) analog channel 300. Since the frequency of the signals going into the signal mixer can have the same frequency, the signal mixer may be thought of as a synchronous rectifier, such that the output of the signal mixer is essentially a rectified waveform.

Offset compensation 306 can then be applied to signal mixer output 314, which can remove the effect of the static Csig, leaving only the effect of ΔCsig appearing as result 324. Offset compensation 306 can be implemented using offset mixer 330. Offset compensation output 322 can be generated by rectifying Fstim 316 using rectifier 332, and mixing rectifier output 336 with analog voltage from a digital-to-analog converter (DAC) 320 in offset mixer 330. DAC 320 can generate the analog voltage based on a digital value selected to increase the dynamic range of analog channel 300. Offset compensation output 322, which can be proportional to the analog voltage from DAC 320, can then be subtracted from signal mixer output 314 using subtractor 334, producing subtractor output 338 which can be representative of the change in the signal capacitance ΔCsig that occurs when a capacitive sensor on the row being stimulated has been touched. Subtractor output 338 is then integrated and can then be converted to a digital value by ADC 308. In some embodiments, integrator and ADC functions are combined and ADC 308 may be an integrating ADC, such as a sigma-delta ADC, which can sum a number of consecutive digital values and average them to generate result 324.

Figures 3B, 3C:
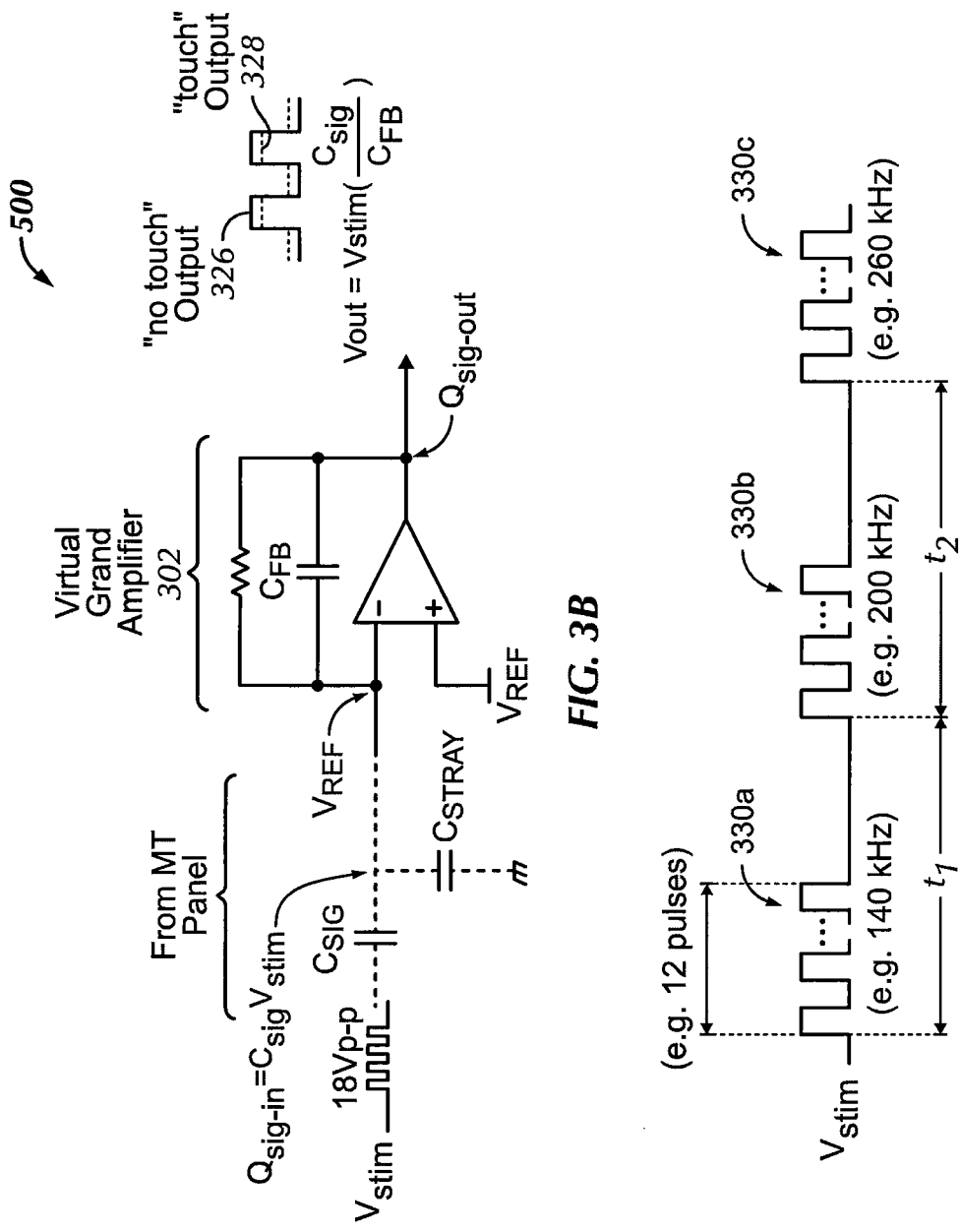
FIG. 3b is a more detailed illustration of a virtual ground charge amplifier at the input of an analog channel, and the capacitance contributed by a capacitive touch sensor and seen by the charge amplifier in accordance with one embodiment of the present invention.
FIG. 3c illustrates an exemplary Vstim signal with multiple pulse trains each having a fixed number of pulses, each pulse train having a different frequency Fstim in accordance with one embodiment of the present invention.

FIG. 3b is a more detailed view of charge amplifier (a virtual ground amplifier) 302 at the input of an analog channel, and the capacitance that can be contributed by the multi-touch panel (see dashed lines) and seen by the charge amplifier. As mentioned above, there can be an inherent stray capacitance Cstray at each pixel on the multi-touch panel. In virtual ground amplifier 302, with the +(noninverting) input tied to Vref, the −(inverting) input is also driven to Vref, and a DC operating point is established. Therefore, regardless of how much Csig is present, the−input is always driven to Vref. Because of the characteristics of virtual ground amplifier 302, any charge Qstray that is stored in Cstray is constant, because the voltage across Cstray is kept constant by the charge amplifier. Therefore, no matter how much stray capacitance Cstray is added to the—input, the net charge into Cstray will always be zero. Accordingly, the input charge Qsig_sense=(Csig−ΔCsig_sense)Vstim is zero when the corresponding row is kept at DC and is purely a function of Csig and Vstim when the corresponding row is stimulated. In either case, because there is no charge across Csig, the stray capacitance is rejected, and it essentially drops out of any equations. Thus, even with a hand over the multi-touch panel, although Cstray can increase, the output will be unaffected by the change in Cstray.

The gain of virtual ground amplifier 302 is usually small (e.g. 0.1) and is equivalent to the ratio of Csig (e.g. 2 pF) and feedback capacitor Cfb (e.g. 20 pF). The adjustable feedback capacitor Cfb converts the charge Qsig to the voltage Vout. Therefore, the output Vout of virtual ground amplifier 302 is a voltage that is equivalent to the ratio of −Csig/Cfb multiplied by Vstim referenced to Vref. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

For noise rejection purposes, it may be desirable to drive the multi-touch panel at multiple different frequencies. Because noise typically exists at a particular frequency (e.g., most wireless devices send bursts at a particular frequency), changing the scanning pattern may reduce the system's susceptibility to noise. Accordingly, in some embodiments, channels (e.g., rows) of the multi-touch panel may be stimulated with a plurality of pulse train bursts. For frequency rejection purposes, the frequency of the pulse trains may vary from one to the other.

FIG. 3c illustrates an exemplary stimulation signal Vstim with multiple pulse trains 330a, 330b, 330c, each of which have a fixed number of pulses, but have a different frequency Fstim (e.g. 140 kHz, 200 kHz, and 260 kHz). With multiple pulse trains at different frequencies, a different result may be obtained at each frequency. Thus, if a static interference is present at a particular frequency, the results of a signal at that frequency may be corrupted as compared to the results obtained from signals having other frequencies. The corrupted result or results can be eliminated and the remaining results used to compute a final result or, alternatively, all of the results may be used.

In one embodiment, system 100 includes auto-scan logic. Auto-scan logic may reside in channel scan logic block 110 of multi-touch subsystem 106, separately from channel scan logic 110 in multi-touch subsystem 106, or entirely separate from multi-touch subsystem 106.

In general, auto-scan logic can autonomously read data from analog channels 108 and provide control of analog channels 108. This is referred to as "auto-scan mode." Accordingly, auto-scan mode enables the system 100 to scan multi-touch panel 124 without intervention from multi-touch processor 102 and while one or more system clocks are disabled. This allows multi-touch system 100 to conserve power or free up components (such as processor 102) to perform other tasks while the system is in auto-scan mode.

For example, because a user may not be continuously inputting data into touch panel 124, it may be desirable to initiate auto-scan mode after a predetermined amount of time has transpired without the system 100 sensing any touch-events. By doing so, the system 100 can conserve power while no data is being inputted (because auto-scan mode is enabled), but power back up once the user resumes inputting data.

Figure 4:
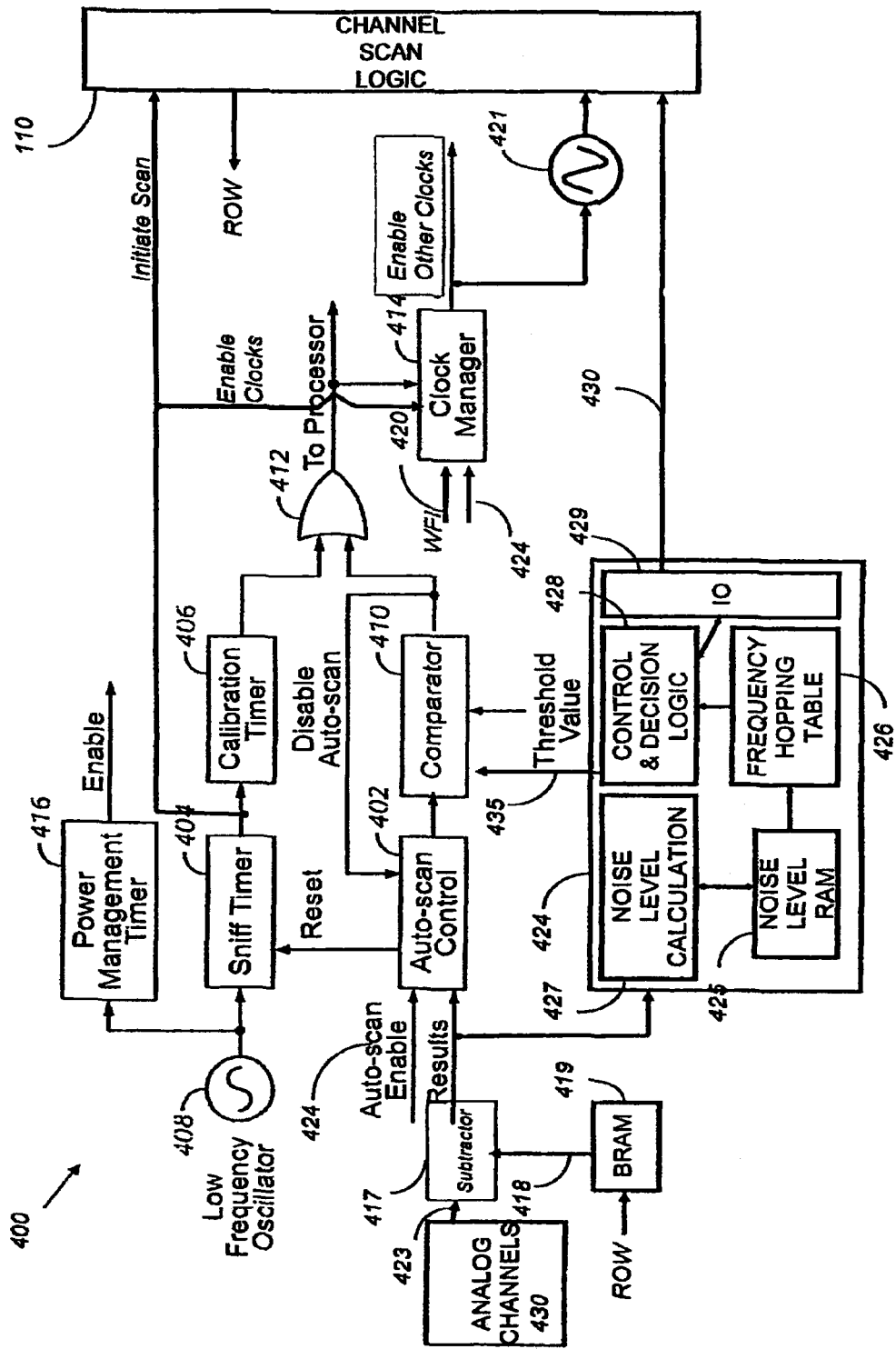
FIG. 4 is a block diagram illustrating auto-scan logic accordance with one embodiment of the invention.

FIG. 4 is a block diagram of one embodiment of auto-scan logic 400. As shown, auto-scan logic 400 can include auto-scan control 402, which can control row address and channel timing functions, among other things. In one embodiment, auto-scan control 402 can include a row address state machine and a channel timing state machine for controlling scanning multi-touch panel 124. As can be appreciated by one skilled in the art, the various functions and components of auto-scan control 402 can be shared with or overlap with channel scan logic 110 and driver logic 114.

Referring further to FIG. 4, sniff timer 404 and calibration timer 406 can be clocked by oscillator 408. Oscillator can be a low frequency oscillator or high frequency oscillator; however, for power conservation reasons, a low frequency oscillator may be desirable. Low frequency oscillator can reside in the multi-touch subsystem 106, or can reside outside of multi-touch subsystem 106.

After a predetermined amount of time (referred to as "sniff time"), sniff timer 404 initiates scan sequence. Note that autoscan mode can be comprised to two individual system states: an actual sniff interval during which only a low frequency oscillator and a sniff time is active, and a scan sequence in which a multi-touch panel is actively scanned. The two system states may form the auto-scan mode.

In one embodiment, high frequency oscillator 421 wakes up instantaneously. The faster the high frequency oscillator wakes up the less time the system spends actively scanning the panel. Further details concerning a high frequency oscillator are described in Applicant's concurrently filed U.S. application Ser. No. 11/649,966 entitled "Automatic Frequency Calibration," the contents of which are herein incorporated by reference in their entirety. In one embodiment, high frequency oscillator 421 is a fast startup oscillator that allows fast lock after the system wakes up from a lower power management state to scan the multi-touch panel. To reduce the time between wake-up, scanning the multi-touch panel and going back into a lower power state, it may be advantageous for the oscillating signal to become stable in a relatively short period in order to minimize the time the system is active and thus to conserve power. Many crystal oscillators may take several milliseconds to stabilize. However, a fast start-up oscillator circuit can stabilize within tens of microseconds, thus enabling the system to go back into a lower power management state much faster than, for example, a system that is driven by a slower stabilizing crystal oscillator.

In general, an auto-scan process can be enabled by first enabling auto-scan control 402 and then putting the processor into a wait for interrupt state. Clock manager 414 then shuts down high frequency oscillator 421 and initiates the sniff timer 404, which after a sniff timeout, causes clock manager 414 to enable high frequency oscillator 421 and then sends a request to the channel scan logic 110 to perform a scan, but keeping the processor inactive. Channel scan logic 110 then acquires a multi-touch image on pixel locations that can be specified through programming appropriate registers. Multi-touch image results from analog channels 430 (which may be analog channel 300 of FIG. 3A) may be subtracted in subtractor 417 by a baseline image stored in baseline RAM 419. The subtracted result can then be compared to a threshold value by comparator 410. If the resulting value is above the programmable threshold value, an interrupt is set and the processor is woken up. If the resulting value is below the threshold value, then the system remains in autoscan mode until either a calibration time expires or an external interrupt occurs.

Accordingly, an auto-scan mode permits multi-touch data input to be read from multi-touch panel 124 while the processor is inactive. In one embodiment, sniff timer 404 is reset each time sniff timer initiates an auto-scan sequence. The sniff time can be in the range of 8 milliseconds to 2 seconds, for example 50 milliseconds.

Calibration timer 406 can wake up processor 102 when auto-scan logic 400 stays in auto-scan mode for an extended amount of time without any touch events detected on touch panel 124 exceeding a threshold, as discussed in more detail below. In one embodiment, the calibration timer 406 initiates a "calibration" upon expiration of a predetermined amount of time ("calibration time"). A "calibration" can include waking up the high frequency oscillator and activating the system clock and processor 102 to perform a scan of the multi-touch panel 102. The calibration can also include calibration functions, such as accounting for any drift in the sensor panel 124. In one embodiment, the calibration time is greater than the sniff time and can be in the range of 2 seconds to 300 seconds.

With further reference to FIG. 4, comparator 410 compares offset compensated results with a threshold value as described above. In one embodiment, if the threshold value is exceeded, then one or more touch events detected on the panel 124 have occurred that take the system 100 out of auto-scan mode and into active scan mode. The comparison of the threshold value with the compensated results can be done on a channel-by-channel, row-by-row basis. In one embodiment, the threshold value can be programmed into a threshold value register.

OR gate 412 can be included between the output paths of calibration timer 406 and comparator 410. Accordingly, when either the calibration time of calibration timer 406 or the threshold value of comparator 410 is exceeded, OR gate can initiate sending an interrupt signal to processor 102 and clock manger 414 for the purpose of re-enabling processor 102 and clocks.

Clock manager 414 can control one or more clocks in system 100. In general, when any clocks are not needed at a given time, clock manager 414 can disable those clocks so as to conserve power, and when any disabled clocks are needed, clock manager 414 can enable those clocks. In one embodiment, clock manager 414 can control low frequency oscillator 408, the high frequency oscillator (not shown) and the system clock (not shown) clocking processor 102.

Power management timer 416 can be included in auto-scan logic 400. Power management timer 416 counts up to a time equal to the sniff time less a delay time. The delay time can be the amount of time needed for the multi-touch system 100 to get ready to perform a scan, "settle" high voltage drivers 118 (i.e. to provide a stable supply of voltage) prior to performing a scan. The delay time can be adjusted via a power manager register, and can be different for each channel 108 that is scanned.

In order to prevent false wakeups due to environmental noise, noise management block 424 can be included. False wakeups can cause a processor to exit the wait for interrupt state and actively scan the panel. Moreover, repetitive false triggers can cause the overall power consumption of a system to increase substantially. Noise management block 424 can advantageously discern whether a threshold value was exceeded due to, for example, a finger touching the panel or due to noise corrupting one of the scan frequencies.

In one embodiment auto-scan logic 400 may scan at more than one frequency and transfer the resulting data to noise management block 424. Noise calculation block 427 can calculate the noise levels based on a history of result data acquired for different scan frequencies and uses noise level RAM 425 to keep a history of noise levels and associated frequencies. Control and decision logic 428 can compare ADC results acquired for one row scan at different frequencies. If, for example, if ADC result data for the scan frequencies track each other within a certain window, then it is likely that a touch condition caused the threshold to be exceeded as a touch condition, as a touch would affect the result values for all of the scan frequencies. However, if result data for a particular frequency are corrupted, then the result data at an individual scan frequency will probably not track the other scan frequencies, thereby indicating that excessive noise caused the threshold to be exceeded instead of a touch condition. In the latter case, the control and decision logic 428 could generate a holdoff signal 435 to prevent the comparator 410 from generating a processor interrupt. If a noisy frequency channel is detected, that frequency can be removed from the frequency hopping table 426 and IO block 429. The frequency hopping table 426 may contain data representing clean frequency channels and may be programmed during factory calibration. Upon completion of a scan, IO block 429 can send a new set of scan frequency data to channel timing logic 110. The frequency data can determine the scan frequencies for the next channel timing sequence. Periodically changing the scan frequencies based on the noise environment make the auto-scan logic 400 more robust, which can ultimately aid in the reduction of power.

In order to reach a low power state, charge amplifiers (such as charge amplifier 302) in each analog channel 430 can be configured to operate in stray capacitance mode. In one embodiment, channel scan logic 110 can initiate a stray capacitance mode by sending a stray capacitance mode initiate signal to analog channels 430. Initiating stray capacitance measurements of a multi-touch panel device is discussed in further detail in Applicant's co-pending U.S. patent application Ser. No. 11/650,511 entitled "Analog Boundary Scanning Based on Stray Capacitance," the entire contents of which are herein incorporated by reference.

However, in one embodiment, using the stray capacitance mode does not provide an accurate location of where a touch event occurred on the panel 124, as the stray capacitance mode provides only an indication that one or more touch events occurred on or near one of the columns being scanned. On the other hand, using the stray capacitance mode can be advantageous because only one scan is needed to determine if a touch event occurred on the multi-touch panel 124; as opposed to a plurality of scans that may be needed using the mutual capacitance mode. Accordingly, using fewer scans can significantly reduce the amount of power consumed to scan the panel 124. For example, in one implementation, it was found that a scan using the stray capacitance mode uses about the same amount of power as the amount of power dissipated due to the leakage current present in a multi-touch system.

Figure 5:
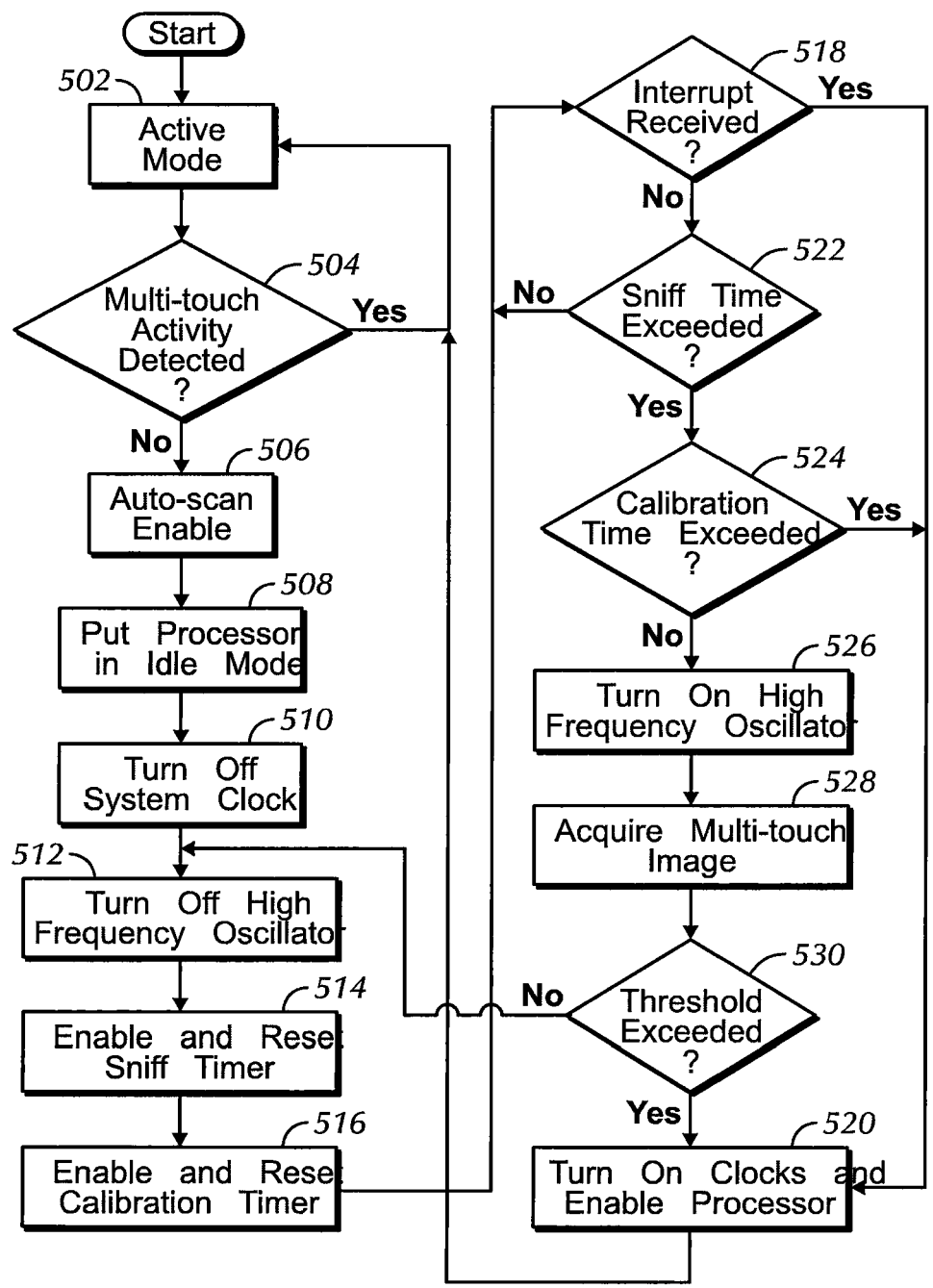
FIG. 5 illustrates an auto-scan process implemented by the auto-scan logic of FIG. 6 in accordance with one embodiment of the invention.

An exemplary auto-scan process 500 in accordance with one embodiment is illustrated in the flowchart of FIG. 5. One skilled in the art will appreciate that various timing and memory storage issues are omitted from this flowchart for the sake of clarity.

The auto-scan process 500 begins with system 100 in active scan mode in block 502. Here, processor 102 is enabled and system 100 is actively scanning the multi-touch panel 124. While still in active scan mode, process 500 determines whether sufficient touch events have taken place on the touch panel within a predetermined amount of time (e.g., in the range of 1 ms to a number of minutes) in block 504. This decision can be performed by, for example, processor 102. Alternatively, a separate processor or dedicated logic, such as channel scan logic 110, can perform this task. If it is found that there has been sufficient touch activity, then process 500 returns to block 502 and the system 100 remains in active scan mode. If, on the other hand, it is determined that there has not been a sufficient touch activity, then auto-scan mode is enabled in block 506.

In one embodiment, auto-scan mode can be enabled by processor 102 sending an auto-scan enable signal to auto-scan control 402. In another embodiment, auto-scan mode can be enabled by having processor 102 set an auto-scan enable bit in an auto-scan register, which is monitored by auto-scan control 402. Further variations of enabling auto-scan mode may also be used, as is appreciated by one skilled in the art.

When the auto-scan mode is enabled, the processor 102 is disabled (e.g., put in an idle mode) in block 508, the system clock is turned off (block 510), and the high frequency oscillator is turned off (block 510). Blocks 508, 510 and 512 serve to conserve power when multi-touch panel 124 is not in use. In the embodiment shown in FIG. 4, auto-scan logic 400 can disable one or more of these components via clock manager 414.

Further to FIG. 5, sniff timer 404 is activated and reset (block 514) as well as calibration timer 406 (block 516). The activation and resetting functions can be initiated by auto-scan control 402. Process 500 then proceeds to decision block 518 to determine whether an interrupt signal has been received, such as a signal from comparator 410 indicating that a threshold has been exceeded. If an interrupt has been received, then any clocks that were turned off during auto-scan mode are turned on and the processor 102 is enabled (block 520). Process 500 then returns to active scanning mode in block 502.

If no interrupt is detected, then process 500 determines if sniff timer 604 exceeded the sniff time (block 522). If the sniff time is not exceeded, then process 500 returns to block 518. If the sniff time is exceeded, then process 500 determines if calibration timer 406 exceeded the calibration time (block 520). If the calibration time is exceeded, then the clocks and processor are enabled (block 514) and active scan mode is enabled (block 502).

If the calibration time is not exceeded, then the high frequency oscillator is woken up (i.e., enabled) in block 526 and an image of the multi-touch panel 124 is acquired (block 528). Various implementations can be used to acquire an image in block 524, which are discussed in more detail further below.

In one embodiment, the image acquired in block 524 is done while processor 102 is disabled. Once an image has been acquired in block 528, process 500 determines if a programmable threshold is exceeded (block 530). This can be done by comparing offset compensated results 324 received from ADC 308 (FIG. 3*a*) with the threshold value. If the threshold is exceeded, then the clocks and processor 102 are enabled (block 514) and the process 500 returns to active scan mode (block 502). If the threshold is not exceeded, then process 500 returns to the block 512 (turning off the high frequency clock).

Further to block 524, various implementations may be used to acquire a multi-touch image. For example, an image may be acquired measuring either a mutual capacitance or a stray capacitance.

When measuring mutual capacitance (which may be referred to as "mutual capacitance mode"), system 100 detects changes in capacitance at each node of the multi-touch panel, as described above with reference to FIGS. 3*b* and 3*c*. Accordingly, to acquire an image of multi-touch panel 124 using the mutual capacitance mode, each row is typically scanned. In alternative embodiments, only select rows are scanned to conserve energy. For example, scanning every other row, or scanning rows located on a certain area of multi-touch panel 124, such as a top, bottom or middle area of the multi-touch panel. In further embodiments, select frames of multi-touch panel 124 are scanned using mutual capacitance mode.

Alternatively, measuring stray capacitance can be used (which may be referred to as "stray capacitance mode") instead of or in combination with the mutual capacitance mode. Measuring stray capacitance in a multi-touch panel device is discussed in further detail in Applicant's co-pending U.S. patent application Ser. No. 11/650,511 entitled "Analog Boundary Scanning Based on Stray Capacitance," the entire contents of which are herein incorporated by reference. Advantageously, the stray capacitance mode can measure the output of all columns of the multi-touch panel 124 in one scan.

Figure 6:
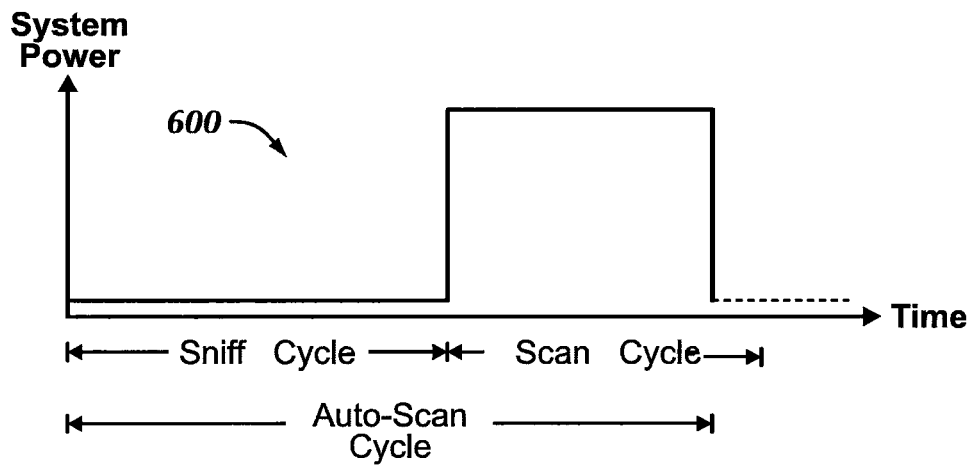
FIG. 6 illustrates a "sniff mode" power management profile in accordance with one embodiment of the invention.

FIG. 6 is a power management profile 600 of an auto-scan cycle in accordance with one embodiment of the invention. One complete auto-scan cycle can be, for example, 50 ms. During sniff mode, very little power is used, as only low frequency clock 408, sniff timer 404 and calibration timer 406 are active. After the sniff time is exceeded, an auto-scan is performed, which is shown as a period of scan activity in FIG. 6. During this time, multi-touch panel 124 is scanned without intervention from processor 102. Thus, low frequency clock 404, high frequency clock, auto-scan control 402 and other components needed perform an auto-scan are powered. This results in more power consumption than occurs during the sniff time, but less than if processor 102 and other clocks were active (e.g., during active scan mode).

Further to FIG. 6, if mutual capacitance mode is used, then one or more rows of multi-touch panel 124 may be scanned. In one implementation, 48 rows are scanned, each row scan taking about 0.1 ms to perform. Accordingly, it takes a total of about 4.8 ms to scan every row. If stray capacitance mode is used, then only one scan needs to be performed. This scan takes about 0.1 ms to perform. Thus, using stray capacitance mode can be faster (0.1 ms as opposed to 4.8 ms in this example) and can also use less power (about 2% of the power used in the mutual capacitance mode described in this example).

Because the stray capacitance mode may not be able to determine an accurate location of where multi-touch panel 124 was touched, a hybrid mode can used in one embodiment. The hybrid mode can include initially using the stray capacitance mode to detect a touch event on the multi-touch panel 124 and, if a touch event is detected, then using the mutual capacitance mode to provide an accurate location of where the touch event occurred.

Furthermore, in one embodiment of system 100, the touch event can be required to happen in a predetermined manner in order to exceed the threshold. For example, the system may require simultaneous or nearly simultaneous touch events to occur in particular locations or in a particular manner (e.g., a simulated dial turning motion). If the threshold is not exceeded, then the auto-scan mode can continue as described in process 500 (e.g., return to block 512).

In one embodiment, auto-scan mode scans at a single frequency band. This may conserve power. Alternatively, auto-scan mode can scan at multiple different frequencies as described with reference to FIG. 3*c*.

In one embodiment auto-scan logic includes a noise management block. The noise management block prevents waking up the processor in cases where threshold levels are exceeded due to presence of noise not because of the user not touching the multi-touch screen. By remaining in auto-scan mode, power is saved. The noise management block can take a survey of noise levels for several channels. If one channel has excessive Csig readings then it is likely an interferer on that channel. If the readings of all channels are the same then it is likely a user touching the panel. Dependent on the noise levels the noise management block provides a frequency-hopping table back to the channel scan logic with frequencies on clean channels. The noise management clock also includes a calibration engine to recalibrate the internal high frequency oscillator to prevent oscillator drift into a noisy channel.

Figure 7:
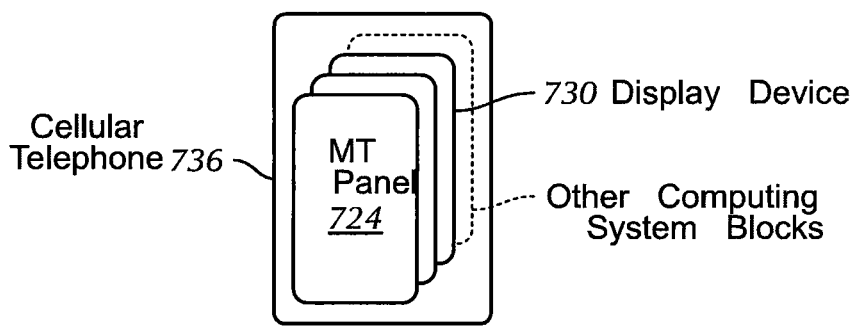
FIG. 7 illustrates an exemplary mobile telephone that may include multi-touch panel, display device, and other computing system blocks in accordance with one embodiment of the present invention.

FIG. 7 illustrates an exemplary mobile (e.g., cellular) telephone 736 that can include multi-touch panel 724, display device 730, and other computing system blocks in the computing system 100 of FIG. 1. In the example of FIG. 7*a*, if a user's cheek or ear is detected by one or more multi-touch panel sensors, computing system 100 may determine that mobile telephone 736 is being held up to the user's head, and therefore some or all of multi-touch subsystem 106 and multi-touch panel 724 can be powered down along with display device 730 to save power.

Figure 8:
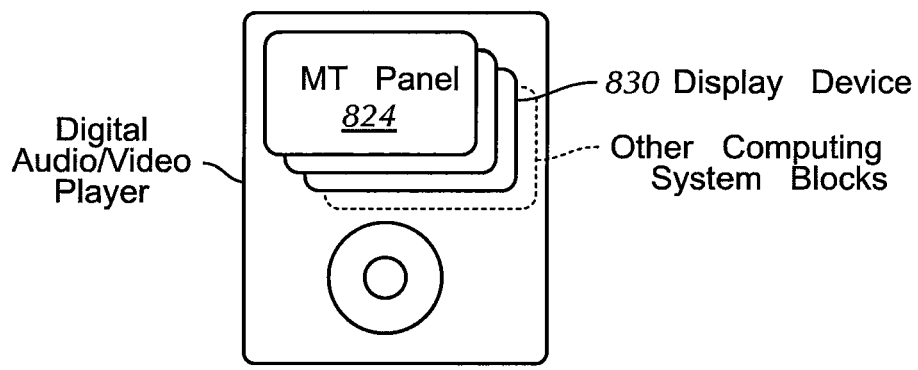
FIG. 8 illustrates an exemplary digital audio/video player that may include a multi-touch panel, a display device, and other computing system blocks in accordance with one embodiment of the present invention.

FIG. 8 illustrates an exemplary digital audio/video player that can include multi-touch panel 824, display device 830, and other computing system blocks in the computing system 100 of FIG. 1.

While this invention has been described in terms of several preferred embodiments, there are alterations, permutations, and equivalents, which fall within the scope of this invention. For example, the term "computer" does not necessarily mean any particular kind of device, combination of hardware and/or software, nor should it be considered restricted to either a multi purpose or single purpose device. Additionally, although the embodiments herein have been described in relation to touch screens, the teachings of the present invention are equally applicable to touch pads or any other touch surface type of sensor.

For example, although embodiments of this invention are primarily described herein for use with touch sensor panels, proximity sensor panels, which sense "hover" events or conditions, may also be used to generate modulated output signals for detection by the analog channels. Proximity sensor panels are described in Applicants' co-pending U.S. application Ser. No. 11/649,998 entitled "Proximity and Multi-Touch Sensor Detection and Demodulation," filed on Jan. 3, 2007 the entirety of which is incorporated herein by reference. As used herein, "touch" events or conditions should be construed to encompass "hover" events and conditions and may collectively be referred to as "events." Also, "touch surface panels" should be construed to encompass "proximity sensor panels."

Furthermore, although the disclosure is primarily directed at capacitive sensing, it should be noted that some or all of the features described herein may be applied to other sensing methodologies. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A touch surface device, comprising:
a sensor panel having at least one sense node that provides an output signal indicative of an occurrence or absence of an event occurring at the panel;
a processor operatively connected to the panel, the processor capable of processing the output signal of the panel; and
auto-scan logic circuitry operatively connected to the sensor panel and the processor, the auto-scan logic circuitry capable of determining the occurrence or absence of an event occurring at the panel without intervention from the processor.

2. The touch device of claim 1, wherein the auto-scan logic circuitry enters an auto-scan mode when no event is sensed on the panel for a predetermined amount of time.

3. The touch device of claim 1, wherein the auto-scan logic comprises a sniff timer, the sniff timer initiating a scan of the sensor panel for determining an occurrence or absence of an event occurring at the panel when the sniff timer reaches a first predetermined amount of time.

4. The touch device of claim 3, wherein the auto-scan logic further comprises a calibration timer, the calibration timer initiating a scan automatically when the calibration timer reaches a second predetermined amount of time which is longer than first predetermined amount of time.

5. The touch device of claim 4, wherein the calibration timer initiates a calibration sequence that accounts for drift present in the sensor panel.

6. The touch device of claim 3, wherein the auto-scan logic comprises a power management timer, the power management timer sending a start-up signal to one or more voltage drivers prior to the sniff timer reaching the predetermined amount of time.

7. The touch device of claim 1, wherein the auto-scan logic comprises a clock manager that is capable of disabling and enabling one or more clocks incorporated in the touch surface device.

8. The touch device of claim 1, further comprising a computing system that incorporates the touch panel device.

9. The touch panel device of claim 8, further comprising a mobile telephone that incorporates the computing system.

10. The touch panel device of claim 8, further comprising a digital audio player that incorporates the computing system.

11. An apparatus for generating an image of an event at a sensitive surface, comprising:
auto-scan logic circuitry couplable to a sensor panel, the auto-scan logic circuitry capable of performing, without intervention from a sensor processor, an auto-scan sequence after a first predetermined amount of time has been exceeded,
wherein the apparatus performs an auto-scan sequence only if the first predetermined amount of time has been exceeded and a calibration time has not been exceeded.

12. The apparatus of claim 11, wherein the auto-scan sequence comprises:
scanning the sensor panel for determining an occurrence or absence of an event at the panel,
generating values representative of the occurrence or absence of events; and
comparing the values representative of events with a predetermined threshold.

13. The apparatus of claim 12, wherein the auto-scan sequence includes measuring stray capacitance.

14. The apparatus of claim 12, wherein an event comprises a touching of an object against a surface of the touch panel.

15. The apparatus of claim 11, wherein the auto-scan logic comprises:
a sniff timer that initiates the auto-scan sequence after the first predetermined amount time has been exceeded; and
a calibration timer that initiates a calibration sequence after a second predetermined amount of time has been exceeded.

16. The apparatus of claim 15, wherein the calibration sequence comprises calibrating the apparatus for drift present in the panel.

17. The apparatus of claim 15, wherein the calibration sequence comprises an active scan of the panel, the active scan including processing performed by the sensor processor.

18. The apparatus of claim 11, wherein the auto-scan logic circuitry forms part of a single multi-touch subsystem for processing events.

19. The apparatus of claim 11, further comprising a computing system that incorporates the apparatus.

20. The touch panel device of claim 19, further comprising a mobile telephone that incorporates the computing system.

21. The touch panel device of claim 19, further comprising a digital audio player that incorporates the computing system.

22. A method for scanning a sensor panel, comprising:
initiating an auto-scan mode after one or more touch events have not been sensed on a sensor panel for a first predetermined amount of time, the auto-scan mode comprising:
a) disabling a sensor panel processor;
b) performing a sniff scan when a second predetermined amount of time has been exceeded; and
c) performing a calibration scan when a third predetermined amount of time has been exceeded.

23. The method of claim 22, wherein performing the sniff scan comprises:
scanning the panel for an occurrence or absence of an event at the panel;
generating one or more values representative of events occurring at distinct locations at the panel and
comparing the one or more values with a threshold and enabling the sensor panel processor if the one or more values exceed the threshold.

24. The method of claim 23, wherein the generating values step includes measuring a stray capacitance value of one or more touch sensors in the sensor panel.

25. The method of claim 23, wherein the step of generating the values includes measuring a mutual capacitance value of one or more touch sensors in the sensor panel.

26. The method of claim 23, wherein the auto-scan mode further includes activating a voltage driver operatively connected to the sensor panel prior to the second predetermined amount of time being exceeded.

27. The method of claim 23, further comprising programming the threshold into a memory storage unit.

28. The method of claim 27, wherein the memory storage unit comprises a programmable register.

29. The method of claim 22, wherein the calibration scan comprises:
activating the sensor panel processor;
scanning the sensor panel for an occurrence or absence of an event at the panel; and
performing a calibration to account for drift present in the sensor panel.

30. The method of claim 29, wherein the calibration scan further comprises turning on a high frequency oscillator.

31. The method of claim 22, wherein the sniff scan comprises obtaining an image of the sensor panel and comparing the image with a threshold.

32. The method of claim 22, wherein the initiating step further includes setting an auto-scan enable bit.

33. The method of claim 22, wherein the performing a sniff scan further includes resetting a sniff timer.

34. An apparatus for sensing an event on a sensor panel, comprising:
means for providing an output signal indicative of an occurrence or absence of an event on a panel;
means for switching to an auto-scan mode after having not sensed a touch event on the sensor panel for a first predetermined amount of time, the switching to the auto-scan mode comprising disabling a processor of the sensor panel; and
means for switching to a sniff mode after a second predetermined amount of time has been exceeded, the switching to the sniff mode comprising performing a sniff scan.

35. The apparatus of claim 34, further including means for performing a calibration mode after a second third predetermined amount of time has been exceeded.

36. A mobile telephone comprising:
a sensor panel having at least one sense node that provides an output signal indicative of an occurrence or absence of an event occurring at the panel;
a processor operatively connected to the panel, the processor capable of processing the output signal of the panel; and
auto-scan logic circuitry operatively connected to the sensor panel and the processor, the auto-scan logic circuitry capable of determining the occurrence or absence of an event occurring at the panel without intervention from the processor.

37. The mobile telephone of claim 36, wherein the auto-scan logic circuitry enters an auto-scan mode when no event is sensed on the panel for a predetermined amount of time.

38. The mobile telephone of claim 36 wherein the auto-scan logic comprises a sniff timer, the sniff timer initiating a scan of the sensor panel, for determining an occurrence or absence of an event occurring at the panel, when the sniff timer reaches a first predetermined amount of time.

39. The mobile telephone of claim 38, wherein the auto-scan logic further comprises a calibration timer, the calibration timer initiating a scan automatically when the calibration timer reaches a second predetermined amount of time which is longer than first predetermined amount of time.

40. The mobile telephone of claim 38, wherein the calibration timer initiates a calibration sequence that accounts for drift present in the sensor panel.

41. The mobile telephone of claim 36, wherein the auto-scan logic comprises a power management timer, the power management timer sending a start-up signal to one or more voltage drivers prior to the sniff timer reaching the predetermined amount of time.

42. The mobile telephone of claim 36, wherein the auto-scan logic comprises a clock manager capable of disabling and enabling one or more clocks incorporated in the mobile telephone.

43. A multi-event sensitive device comprising:
a sensor panel having a plurality of sense nodes that provide output signals indicative of an occurrence or absence of an event occurring at the panel;
auto-scan logic circuitry operatively connected to the sensor panel, the auto-scan logic circuitry capable of determining the occurrence or absence of an event occurring at the panel in an auto-scan mode, the auto-scan logic comprising noise management circuitry configured to differentiate between an occurrence of an event and noise present in the device; and
a processor operatively connected to the auto-scan logic, the processor configured to be disabled when the auto-scan mode is activated and the processor configured to be enabled when the auto-scan mode is deactivated.

44. The multi-event sensitive device of claim 43, wherein determining the occurrence or absence of an event occurring at the panel comprises measuring a change in stray capacitance in the sensor panel.

45. The multi-event sensitive device of claim 43, wherein determining the occurrence or absence of an event occurring at the panel comprises measuring a change in mutual capacitance in the sensor panel.

* * * * *